United States Patent [19]
Burks et al.

[11] 3,859,128

[45] Jan. 7, 1975

[54] COMPOSITION FOR RESISTIVE MATERIAL AND METHOD OF MAKING

[75] Inventors: Darnall P. Burks, Milford, N.H.; John P. Maher, North Adams; Jacob H. Martin, Wellesley, both of Mass.; Franklin D. Frantz, Jr., Woodford, Vt.; Arthur Leo Lemoine, North Adams, Mass.

[73] Assignee: Sprague Electric Company, North Adams, Mass.

[22] Filed: Feb. 26, 1971

[21] Appl. No.: 119,239

Related U.S. Application Data

[63] Continuation-in-part of Ser. No. 704,449, Feb. 9, 1968, abandoned.

[52] U.S. Cl. ............... 117/213, 117/54, 117/100 B, 117/100 S, 117/130 E, 117/217, 117/227, 117/514
[51] Int. Cl. ........................ B44d 1/20, C23b 5/62
[58] Field of Search ............ 117/227, 100 B, 100 S, 117/514, 217, 130 E, 213, 54

[56] References Cited
UNITED STATES PATENTS

| | | |
|---|---|---|
| 2,717,946 | 9/1955 | Peck .......................... 117/227 X |
| 2,743,196 | 4/1956 | Robinson ...................... 117/100 S |
| 3,031,344 | 4/1962 | Sher et al. .................... 117/217 X |
| 3,237,066 | 2/1966 | Chiecchi ....................... 117/227 X |
| 3,345,158 | 10/1967 | Block et al. ................... 252/514 |
| 3,347,799 | 10/1967 | Wagner ......................... 117/227 X |
| 3,379,556 | 4/1968 | Chiecchi ....................... 117/47 |
| 3,385,799 | 5/1968 | Hoffman ....................... 117/227 X |
| 3,413,240 | 11/1968 | Short ............................ 252/518 X |
| 3,537,892 | 11/1970 | Milkovich et al. ............. 117/227 |

*Primary Examiner*—Mayer Weinblatt
*Assistant Examiner*—Michael F. Esposito
*Attorney, Agent, or Firm*—Connolly and Hutz

[57] ABSTRACT

A particulate glass-metal composition for fusion into a resistive film has glass-containing particles which are coated with a metal layer that is bonded to the particle surfaces. Upon fusion of the particulate composition, conduction takes place through the coalesced resistive film. The coating of the particle includes cleaning the particle surfaces and sensitizing the surfaces prior to the deposition of the metals. The glass-metal particulate composition mixed with a suitable medium is applied and fired into a film resistance.

5 Claims, 4 Drawing Figures

3,859,128

COMPOSITION FOR RESISTIVE MATERIAL AND METHOD OF MAKING

CROSS REFERENCES TO RELATED APPLICATIONS

The present application is a continuation-in-part of U.S. Pat. application Ser. No. 704,449, filed Feb. 9, 1968 and later abandoned.

BACKGROUND OF THE INVENTION

This invention relates to the preparation of glass-metallic resistance material, and more particularly to a particulate composition of glass and metal and the method of making the particulate composition and converting the composition into a resistive film.

Glass-ceramic-metallic resistance devices have been comprised of a previously prepared mixture of ingredients including insulating materials, semiconducting materials, and conductive precious metals which are converted to resistive bodies, such as resistors. This includes devices employing a cermet which is an alloy of a metal and a ceramic with high temperature capabilities. The substances from which the resistive bodies have been formed are made up by combining the component materials in a uniform dispersion of the metal in particulate form among the particles of the ceramic. For example, the metal particles are dispersed in finely divided particles of a glass frit. This has been done by various means. In one method very small particles of the metal are mixed with small particles of glass producing a composition of mixed metal and glass particles. Subsequently this glass-metal composition is fired to produce a continuous phase of solidified glass with minute metal particles uniformly dispersed throughout.

In another method, finely divided glass particles are mixed with a solution of metal or metals. The solution is volatilized or pyrolyzed to deposit the metal on the glass particle surfaces and the resultant material is fired to vitrify the glass particles into a solid body containing the metal which provides a resistive conduction through the glass body and results in a suitable resistive material. The resistor compositions may also include finely divided semiconductive oxide mixed with the finely divided frit particles and the metals. Conductive films have been obtained with a high percentage by weight of the glass frit and a relatively low percentage of palladium powder plus silver.

It has been found that these glass-ceramic-metallic conductive or semiconductive mixtures are either difficult to control for high resistivities or relatively high percentages of metal are required in the glass-to-metal ratio.

Further, the glass-ceramic-metallic mixture must be applied only in a relatively thick coat in order to provide a reproducible resistance path.

It is desirable to readily reproduce a resistance device having low percentages of metal in the conductor-to-insulator ratio and which device at the same time has a small and relatively flat temperature coefficient of resistance. High stability in use, low voltage coefficient, and low noise factor are also desirable characteristics.

SUMMARY OF THE INVENTION

This invention provides an electrical body having resistivity, on a non-conducting refractory substrate having a conductive material in a vitrified matrix of coalesced insulating material which is formed by firing a glass-metallic particulate composition resulting from the deposition of the conductive material on glass-containing insulator fines. Films formed by this invention have a wide range of resistivities and provide suitable resistors. More particularly, this invention provides for a distribution of metal in glass in the glass-metallic particulate composition on firing at a controlled temperature that results in a film for electrical uses having superior mechanical properties, improved temperature coefficient of resistance, good voltage coefficient and noise properties as well as being reproducibly conductive in a very thin layer.

More specifically, the surfaces of the glass particles are prepared by first cleaning and etching, then sensitizing with a nucleating agent. A metal layer is plated thereon, as by electro-less plating. The deposit of the metallic material on the particle surfaces is easily controlled, resulting in a superior control of the source material for the resistive bodies. This results in superiority of both the quality and structure of the final product.

An improved resistive film may then be formed under suitable conditions, including firing in a specified temperature range.

It is an object of this invention to provide a very thin metallic-glass resistance film being readily reproducible and having an improved temperature coefficient.

There is another object of this invention which is a glass-metal oxide-noble metal resistance material with an improved distribution of the metal and metal oxide in the glass.

A further object is a coalescent insulating material with metal oxide and precious metal in a resistive film having a low percentage of metal for the given resistivity.

It is an object to provide a stable resistive film having longevity with a high percentage of glass sealing the resistive structure.

Still another object of this invention is a simplified and reproducible method of providing a relatively thin resistance film with high sheet resistivity from an insulator-metallic-metal oxide composition.

The provision of a metal plated glass or glass-ceramic composition for a superior resistive material is an object of this invention.

Still another object of this invention is a stable glass-metal oxide-noble metal resistor having a flat temperature coefficient which is easily reproducible, long lived, stable and compatible in hybrid integrated circuits.

It is an object of this invention to provide an economical film resistor.

BRIEF DESCRIPTION OF THE DRAWINGS

The above and other objects of this invention will become more apparent upon consideration of the following description taken with the accompanying drawings in which.

Figure 1:
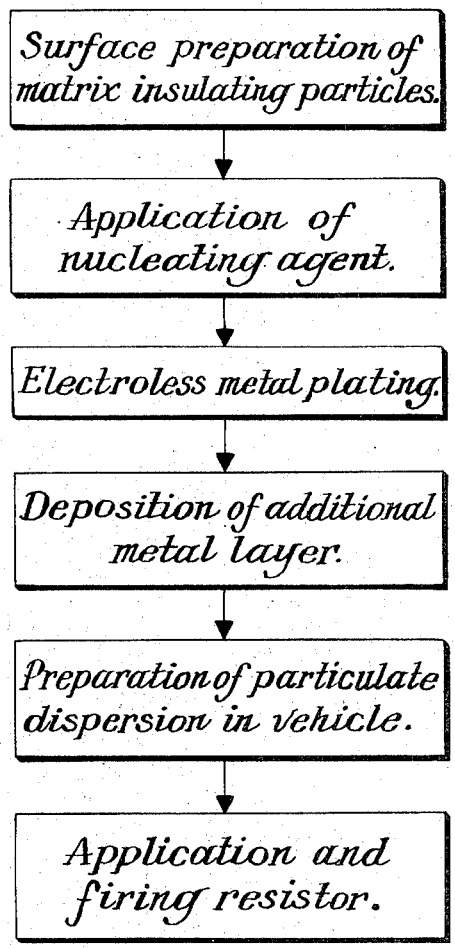
FIG. 1 is a block chart identifying steps of the method of producing a resistor according to this invention.

In its preferred embodiment the fired material of this invention is made from a particulate fusible glass-containing composition made up of a metallic coating of fines of glass or glass-ceramic having a preponderant vitreous content, so that they are characterized by fusing when fired over a broad temperature at which coalescing takes place. The fusible material may be glass, a completely amorphous substance, but may also be comprised of a glass-ceramic having a fine grained polycrystalline structure which has vitreous properties as referred to herein. A glass-ceramic includes a nucleating agent which has been heat treated to produce randomly oriented crystals which constitute a major portion of the body as more fully disclosed in the *Symposium of Nucleation and Crystallization in Glasses and Melts*, published by American Ceramics Society, 1962. This glass frit has good electrical properties and good chemical durability. This fusible, glass-containing material is preferably alkali-free which enhances stability.

The glass-containing particles may be cleaned and etched with a caustic solution initially, and subsequently sensitized with a nucleating agent. The nucleating agent is provided by a metal ion gel or a metal halide or a partially hydrolyzed halide and a colloidal deposit. The particles may then be plated with a noble metal such as gold, silver, platinum and palladium which has a relatively positive electro-potential and which does not enter readily into chemical combination with non-metals. The particles are then provided with an overlay of a metal from the platinum group, i.e., platinum, palladium, osmium, ruthenium, iridium and rhodium.

In one embodiment, an electroless plated noble metal plate has deposited over it a metallic layer of a platinum group metal, namely platinum, palladium, osmium, iridium, ruthenium and, rhodium. It has been found that the platinum group metal used in this manner converts in whole or in part to a semiconducting metal oxide during firing. The semiconductive characteristic is present in the completed metal film so that the conversion which creates the characteristic occurs before the film is completed. As a rule, the platinum group metals in the plated glass composition have the semiconductive characteristic after the firing step.

The inclusion of modifiers in the form of metals or oxides of metals from Groups IV B, V B, VI B, VII B, VIII B and I B, otherwise known as transition metals, are also contemplated. The addition of small amounts of these transition metals may modify the properties of the completed metal film.

When dried, the plated glass composition is a frit made up of small particles of glass or glass-ceramic with a plated-on coating. This coating has a first component with the metallic characteristic of the noble metals and a platinum group second component which unexpectedly provides the semiconductive characteristic of the fired material in the completed film as indicated above. The total metal of the first and second components may be varied from 10 to 60 percent by weight of the total frit 40 to 90 percent by weight therefore being the weight of the fine particles present. The ratio of the metal of the first or metallic component to the metal of the second or semiconductive component may be varied from 0 to 50 percent. Thus, the platinum group or second component is essential while the first component is preferred. Resistive properties of the completed film may be modified by the addition in various small amounts of the modifiers, for example in percentages of 0.005 to 10 percent by weight of the total metal in the particulate plated glass composition.

The particulate plated glass composition is fusible by firing at an elevated temperature in a range to result in a film which includes both the metallic characteristic component and the semiconductive characteristic component. The firing temperature ranges from the temperature at which the glass begins to fuse and the platinum group metal begins to oxidize and become integrated with the glass up to the temperature at which the semiconductive component ceases to exhibit an effective semiconductive characteristic. The distinctive film from the particulate plated glass composition does not begin to form until firing at least to 1,000°F.

In one application of this invention, the particulate plated glass composition is formulated into a silk screenable squeegee ink by mixing it with a suitable binder, as for example ethylcellulose and terpineols. The ink is screened through a silk screen of suitable mesh such as a 200 mesh or a 306 mesh onto a refractory substrate and the resulting film is fired in air on the substrate in a temperature range of from 1,350°F to 1,750°F and preferably in the range of 1,450°F to 1,650°F. The resultant resistive film is thinner than prior art glass or glass-ceramic films. The films of this invention may be suitably sealed from the ambient atmosphere as with a dense layer of glass.

The resistor has very low temperature coefficient, stability, low noise, adequate voltage coefficient and is sturdy.

Referring to the flow sheet of FIG. 1, the first step in the preparation of the particulate glass-metallic resistor composition of this invention is the cleaning and etching of finely divided glass particles with a caustic solution, or ball-milling immediately before use herein. These particles consist of a glass or glass-ceramic material having a melting point which is compatible with the attainment of optimum electrical characteristics.

In the next step, the glass, whose particle surface has been prepared as above, is suspended in a solution which provides a nucleating agent on the particle surfaces. For example, the surface of the particles is sensitized in 0.1 percent silver chloride solution and then the particles are suspended in a mild silver preteinate, to deposit colloidal silver (nucleating agent) on the particle surfaces. The colloidal silber adsorbed on the particle surface is a nucleating agent for subsequent plating.

The particles are now ready for the electroless plating of metal or metals. This is accomplished by introducing the sensitized particles into a heated metal solution containing a metal salt which will precipitate metal on the particles either by addition of a reducing agent, reducing the metal ion in solution and causing precipitation on the sensitized particles, or by having a sensitized particle which will itself reduce the metal ion from the solution.

In the following step, illustrated in FIG. 1 an additional metal may be deposited over the first metal layer in a sequential operation. After washing and drying the plated particles, a homogeneous particulate cermet composition is obtained.

A glass-metal dispersion is prepared from the particulate composition in the next step as illustrated in FIG. 1. For example, the composition may be mixed with a squeegee medium and blended to a suitable viscosity.

In the final step the viscous mixture is applied onto a substrate and fired in air at a temperature to coalesce the composition ingredients so that they flow, integrate and fuse into a film wherein the glass or glass-ceramic is a matrix and the metals and metal-oxides integrated therein provide conductivity. The firing temperature is in a temperature range in which the glass begins to sinter before the metal drastically changes its state. It is believed the glass fuses into a skeleton around the metal, but does not become overly fluid so as to excessively wet the metal and to inhibit the formation of paths of electrical conductivity. The glasses that begin to sinter at around 1,000°F are suitable. With silver-palladium components, the preferred range is 1,450°F to 1,650°F.

The firing also converts the platinum group component into a condition wherein it exhibits the semiconductive characteristic. For example, palladium is converted to palladium oxide.

The matrix used herein must be glass or a glass-ceramic having an appreciable glass content. If the matrix was a ceramic, then upon firing, the metal coated ceramic particles would sinter the metal to metal forming a conductive surface. However, it was found that glass particles coated with metal, as described herein, flow or fuse upon firing in such a manner that the metals and metal oxides become integrated within the glass. The glass particles should be fine particles as well.

The film thickness is varied by the mesh dimensions when the viscous mixture is applied to the substrate by screening. The film thickness decreases with increasing mesh number. Further processing steps may take place as, for example, the application of an overglaze, not illustrated. The overglaze material is selected so as to be similar to the resistor glaze of the glass frit having a compatible expansion coefficient, while not being reactive with the components of the resistive film.

The following illustrative examples are not limitative.

EXAMPLE I 100g of fine lead-borosilicate glass particles, having 80 percent of the particles less than 4.2 microns in diameter, was washed in 500 ml. of sodium hydroxide solution (40g/liter) for 30 minutes, filtered and washed. The treated glass was then suspended in a solution of 3.3g of stannous chloride, 30 ml. of concentrated hydrochloric acid and 1 liter of water, filtered and washed and then stirred in a suspension of a colloidal silver solution commercially known as "Argyrol", 8.8g silver proteinate per 100 ml. solution, to reduce silver onto the particle surfaces.

The liquid and solids from the Argyrol solution were then transferred to a bath composed of the combination of 1,320 cc of water containing 2.64g silver nitrate and 2.24g Rochelle salt and 1,320 ml. of water containing 13.2g of silver nitrate. The mixed solutions and slurry were held at 90°C to deposit a silver film and, finally the solution is treated with 40 ml. ammonia and 10 percent hydrazine was added to complete the reaction.

The particles were separated by filtration and the plated particles placed in 1,915 ml. of water, 640g of concentrated ammonium hydroxide, 61g of disodium ethylene diaminetetracetic acid and 25 ml. of a 10 percent solution of hydrazine. The mixture was heated to 80°C and 530 ml. of a palladium ammonium complex (28g Pd/liter) was added and stirred in. After 20 minutes the solids were separated, washed and dried.

To the 25g of plated frit particles was added 2.7 grams of a 13 percent ethylcellulose in terpineol solution thinned with 8.0g of pine oil for each 25 grams of frit to form a squeegee ink.

Twenty resistive pieces were screened through a 306 mesh screen onto an aluminum oxide substrate and fired at 1,600°F for 35 minutes. Electrodes were pre-fired 306mesh platinum. The resistors, 0.150 × 0.050 inch had an average resistivity of 8 k/sq., a TCR of −50 ppm/°C from 25° to −65°C and +280 ppm/°C from 25°C to +125°C. The resistors had a noise factor of 0.4–2.4 $\mu$V/V decade.

The plating of palladium on glass particles without using a noble metal first layer is done by coupling palladium with tin gel as by dissolving palladium chloride in water. The palladium chloride solution is then treated with a hydrated tin oxide and the gel coupled palladium is reduced with a mild non-contaminating organic reductant. Surface bound reduced metal provides nuclei for deposition of more palladium for the electroless plating bath.

The following is a specific example of plating palladium on the glass particles, without the initial use of a noble metal base.

EXAMPLE II 10 percent by weight of powdered palladium chloride was added to distilled water. A clear reddish-brown solution containing 4–5 percent palladium chloride was obtained by filtering with undissolved material. A moist washed cake of glass particles was prepared in a sodium hydroxide solution, that cleans and etches the particle surface. The treated glass was suspended in a solution of stannous chloride, concentrated hydrochloric acid and diluted with water and filtered and washed and then stirred in a suspension of mild silver proteinate solution to reduce silver onto the particle surfaces. The liquid and solids from the Argyrol solution were then transferred to the palladium chloride solution by adding the proteinate/chloride solution dropwise with stirring. Palladium chloride was absorbed to saturate the tin gel and then palladium was plated on the glass particles and the glass became cream colored. Seven milliliters of the palladium chloride solution was added. The suspension was then stirred and a 37 percent Formalin solution was added with warming and the warming and stirring continued at 60–80°C for an hour and a half. The solids were retrieved, washed and dried to obtain a moist cake.

The moist cake of the above Example may be used as the base for further plating, if desired.

The following is a specific example of plating iridium directly on the glass particles, without the initial use of a noble metal base.

EXAMPLE III 100 grams of fine lead borosilicate glass particles were stirred in one liter of water for one-half hour, the suspension allowed to settle and the water decanted. The residue and the remaining water were separated by filtration. 50 grams of the resultant frit were suspended in 50 milliliters of water by rotating in a ball mill for 1 hour.

18 grams of iridium tetrachloride was dissolved in 350 milliliters of distilled water and then 16 grams of ethylene diamine tetracetic acid was added. Approximately 50 milliliters of 20 percent of sodium hydroxide was added to adjust the pH to 12.0. The slurry of the fine frit was added to the solution and the pH adjusted to 12. The suspension was warmed to 40°C and sodium borohydride containing mercapto succinic acid was added dropwise (about 5 drops per minute) to prevent too vigorous a reaction from taking place. The mixture was heated to 50°C with continued stirring to deposit iridium on the glass particles.

After three hours the temperature was raised to 80°C and additional sodium borohydride was added. The borohydride is added without mercapto succinic acid. The mixture was stirred for another hour and the suspended glass particles are coated with a dark iron gray plate of iridium. The suspended solids were allowed to settle and the supernatant liquor was decanted off and the remainder filtered and washed and dried at 70°C.

The moist cake of Example III may be used as the base for further plating, if desired.

The following is a specific example of plating ruthenium directly on the glass particles.

EXAMPLE IV 100 grams of fine lead borosilicate glass particles were stirred in one liter of water for one-half hour, the suspension allowed to settle and the water decanted. The residue and the remaining water were separated by filtration. 50 grams of the resultant frit were suspended in 50 milliliters of water by rotating in a ball mill for 1 hour.

16.6 grams of ruthenium trichloride was dissolved in 400 milliliters of distilled water and then 24.0 grams of ethylene diamine tetracetic acid was added. Approximately 200 milliliters of 1N sodium hydroxide was added to adjust the pH to 12.0. The slurry of the fine frit was added to the solution and the pH adjusted to 12. The suspension was warmed to 40°C and sodium borohydride containing mercapto succinic acid and sodium hydroxide was added dropwise (about 5 drops per minute) to prevent too vigorous a reaction from taking place. The mixture was heated to 50°C with continued stirring to deposit ruthenium on the glass particles.

After 3 hours the temperature was raised to 80°C and additional sodium borohydride was added. The borohydride is added without mercapto succinic acid and sodium hydroxide. The mixture was stirred for another hour and the suspended glass particles are coated with a plate of ruthenium. The suspended solids were allowed to settle and the supernatant liquor was decanted off and the remainder filtered and washed and dried at 70°C.

The moist cake of Exampe IV may be used as the base for further plating, if desired.

Figure 2:
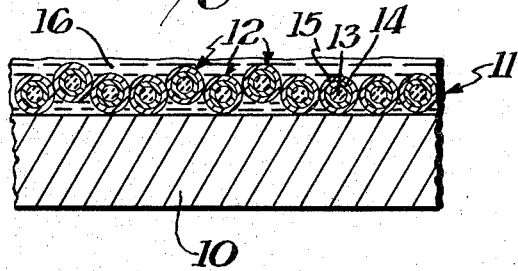
FIG. 2 is a vertical section of a particulate composition according to this invention in a layer on a substrate.

Referring to the illustrated embodiment, FIG. 2 shows a substrate 10 on which is laid a layer of particulate material 11. Particles 12 of the layer 11 are each made up of a glass fine 13 with a first metal layer 14 bonded directly to the surface of the glass fine 13 and a second metal layer 15 over the first layer 14. A screening medium 16 surrounds the particles 12 which are embedded in the material 16 and adhered to the substrate 10. The substrate 10 with the layer 11 adhered thereto, can be handled and moved into a firing furnace to drive off the material 16 and coalesce the particles 12, causing the glass to melt and fuse in such a manner as to integrate the metal with the glass.

Figure 3:
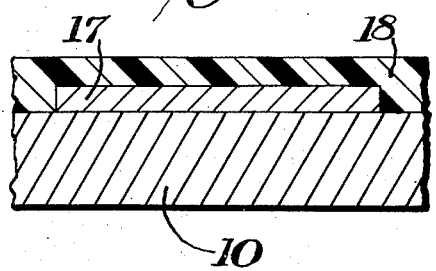
FIG. 3 is a vertical section of a completed resistance film covered by an overglaze.

FIG. 3 shows the substrate 10 with the resistive film 17 formed by firing the composition of the layer 11. This thin film has a thickness of the order of less than one mil. An overglaze 18 is applied over the thin film 17.

The following table sets forth some typical film resistor compositions obtained according to this invention by firing the film forming composition on a 35 minute cycle to a 1,600°F peak. The TCR (temperature coefficient of resistance) was taken from 25°C to −65°C. The components palladium, silver and glass are shown in the three leftmost columns in parts by weight. The thickness of the film is shown as measured by the screen mesh. The resistance characteristic is measured by sheet resistivity which is the resistance in ohms per square of a given sheet.

Typical Resistor Compositions

| Pd* | Ag* | Glass* | Screen Mesh | $\rho$(ohms/sq.) | TCR ppm/°C |
|---|---|---|---|---|---|
| 15 | 10 | 100 | 200 | 5K | ~+10 |
|  |  |  | 306 | 52K | −600 |
| 13 | 7 | 100 | 200 | 30K | −170 |
|  |  |  | 306 | 150K | −350 |
| 11.2 | 7.8 | 100 | 200 | 14K | ~−10 |
|  |  |  | 306 | 300K | −200 |
| 93 | 7 | 100 | 200 | .6Ω | +1000 |
|  |  |  | 306 | 1.6Ω | +950 |
| Ir* | Au* | Glass* |  |  |  |
| 15 | 10 | 100 | 200 | 2M | −975 |
|  |  |  | 306 | >10M |  |
| 15 | 15 | 100 | 200 | 110K | −660 |
|  |  |  | 306 | 500K | −800 |

*Parts by weight

The films are fired at from 1,350°F to 1,750°F and preferably between 1,450°F and 1,650°F. A limitation of the firing temperature is the decomposition temperature of the oxide of the platinum group metal.

The resistor has superior temperature coefficient characteristics and good noise and voltage coefficient characteristics. Inks for screening have been prepared with produce resistors with resistivities from 800 Ω/sq. to 80 Ω/sq. having less than 2 percent resistance change over the range of temperatures from −65°C to +125°C with the minimum of resistance change near room temperature.

Figure 4:
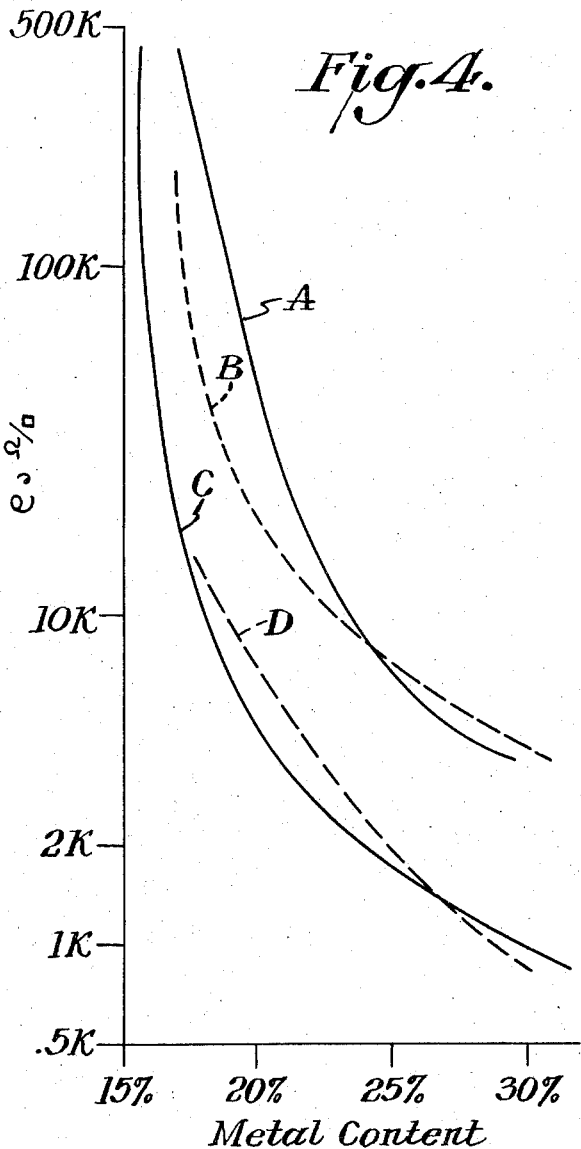
FIG. 4 is a graph showing the percent by weight of metal content as related to resistivity of ohms/square in resistive films of this invention.

A particular advantage of the resistor is illustrated in the graph of FIG. 4. In FIG. 4 the percentage of metal content by weight in the resistive body is shown in relation to the resistivity of ohms per square. The resistivity is plotted on the ordinate while the percentage by weight of the metal is plotted on the abscissa.

Curves A and B depict the relationship for ceramic-metallic films of silver and palladium deposited through a 306 mesh screen and curves C and D depict the relationship for glass-metallic films of silver and palladium deposited through a 200 mesh screen. For higher resistivites of greater amount of silver is preferred and for low resistivities considerable palladium is preferred. High resistivity inks and low resistivity inks can be blended into intermediate resistivity inks. Solid curves A and C represent directly prepared unblended inks and broken curves B and D represent mixing curves. In screened resistors deposited through a 200 mesh screen a resistivity of less than 10 kilohms per square can be obtained with metal content of less than 20 percent. Further, less than 100 megohm per square resistivity can be obtained with film constitution of more than 70 percent glass. This illustrates the distinctive feature of the present invention in providing a "thin" film with low resistivity at a relatively low metal content. In contradistinction, in previous films prepared from mixed metal powder and frit, appreciably more than 20 percent metal content is required for comparable conductivities.

Resistive films are possible as thin as 0.1 mil, further uniquely conductive films are provided with film thicknesses of 0.5 mil and less.

While the above description contain illustrations of the invention it will be understood that the various embodiments are set forth for the purpose of illustration only and that further modifications are possible. For example, the illustrated metal systems are susceptible to adaptation within the spirit of this invention and it is intended that the scope be limited only by the appended claims.

What is claimed is:

1. The method of making a resistive film comprising:
   a. preparing the surface of glass-containing particles, having a vitreous content of 40 to 90 percent by weight, to accept a nucleating agent,
   b. applying to the surface of said particles a colloidal deposit of nucleating metal of colloidal size selected from the group consisting of a metal ion gel, a metal halide or a partially hydrolyzed metal halide,
   c. depositing by electroless deposition and bonding additional metal to the surface of said particles via said nucleating metal, said additional metal comprising at least one layer of a member selected from the platinum group metals,
   d. mixing said particles with a suitable binder and applying the dispersed particles onto a refractory substrate; and,
   e. firing said dispersed particles and said substrate at a temperature of at least 1,000°F so that said additional metal becomes oxidized and integrated with said glass-containing particles to form a resistive film.

2. The method of claim 1 wherein the surface of said glass-containing particles as prepared by cleaning and etching said particles with a strong alkali, said nucleating metal is provided by a colloidal suspension of silver proteinate, and said firing is performed in a temperature range of 1,350°F to 1,750°C.

3. The method of claim 1 wherein said nucleating metal is provided by a colloidal silver suspension, and said platinum group metal is present in an amount from 10 to 60 percent by weight of the total particulate composition to be fired.

4. The method of preparing a resistive film which comprises applying a nucleating agent to glass-containing particles having a vitreous content of 40 to 90 percent to sensitize the particle surfaces, depositing by electroless deposition a metal coating on the sensitized particle surfaces, applying the coated particles on a substrate wherein the improvement comprises sensitizing the surfaces of glass-containing particles with surface-adsorbed nucleating metal of colloidal size, depositing on the sensitized surface of metal of from 10 to 60 percent by weight of the total particle composition selected from the group consisting of a member selected from the platinum group metals, and fusing the deposited metal by firing at an elevated temperature of 1,350° – 1,750°F to result in a film which includes both the metallic characteristic component and the semiconductive characteristic component.

5. A resistive film on a non-conducting substrate consisting of a metal selected from the group consisting of a member selected from the platinum group metals deposited by electroless deposition and oxidized on a nucleating agent sensitized surface of glass-containing particles having a vitreous content of 40 to 90 percent by precipitating from a solution of a salt of said metal and firing at a temperature in the range of 1,350°F – 1,750°F to form an integrated resistive film of the metal and the vitreous position, the proportion of the metal to the total particles composition and the oxidation and integration of deposited metal being such as to cause the resistive film to have a resistance value of the order of $6 \times 10^2$ to $3 \times 10^5$ ohms per square.

* * * * *